April 15, 1947. L. H. MIDDLETON 2,418,895
GENERATOR CONTROL DEVICE HOUSING
Filed Sept. 14, 1944 4 Sheets-Sheet 1
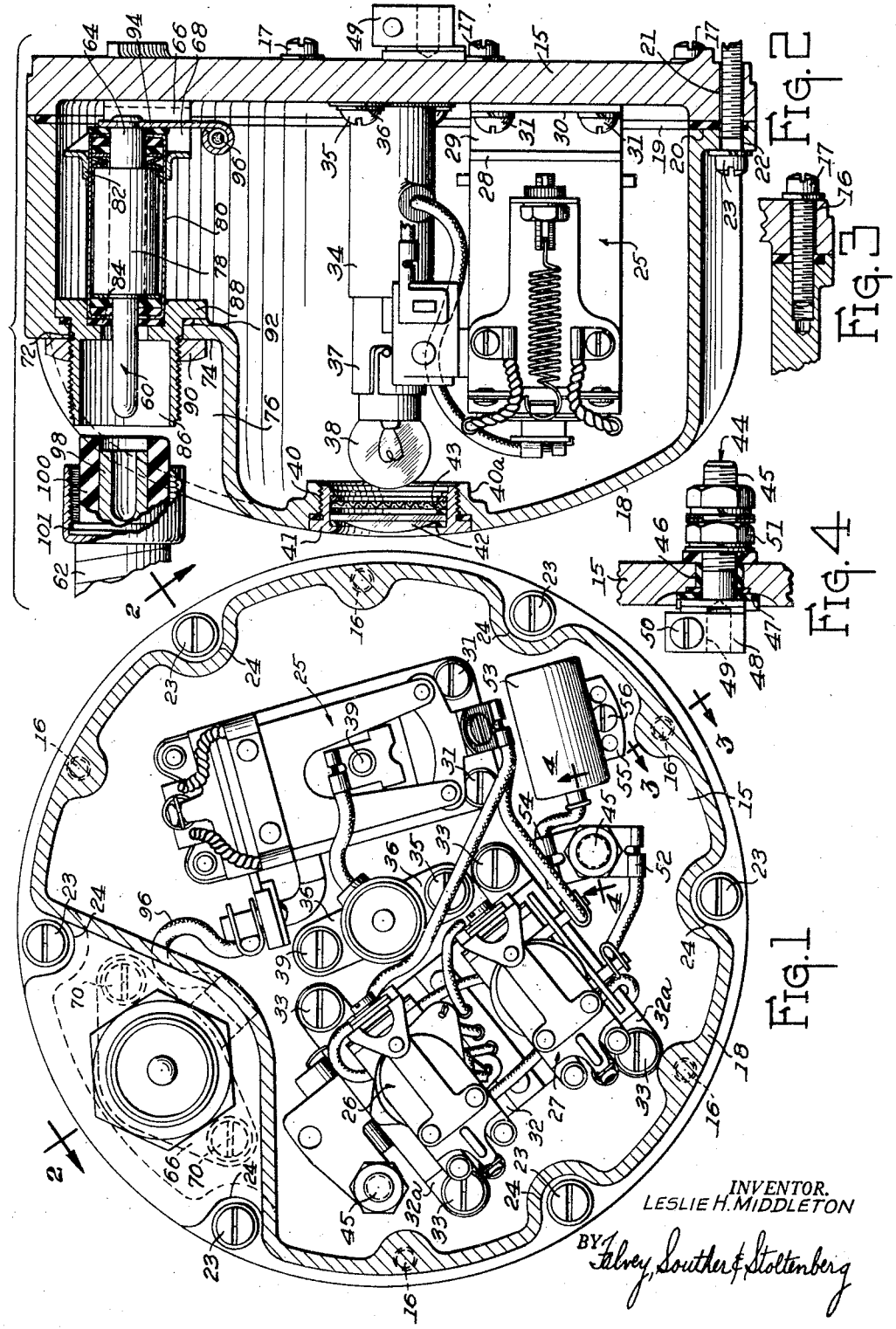
INVENTOR.
LESLIE H. MIDDLETON
BY Falvey, Souther & Stoltenberg April 15, 1947.  L. H. MIDDLETON  2,418,895
GENERATOR CONTROL DEVICE HOUSING
Filed Sept. 14, 1944  4 Sheets-Sheet 2
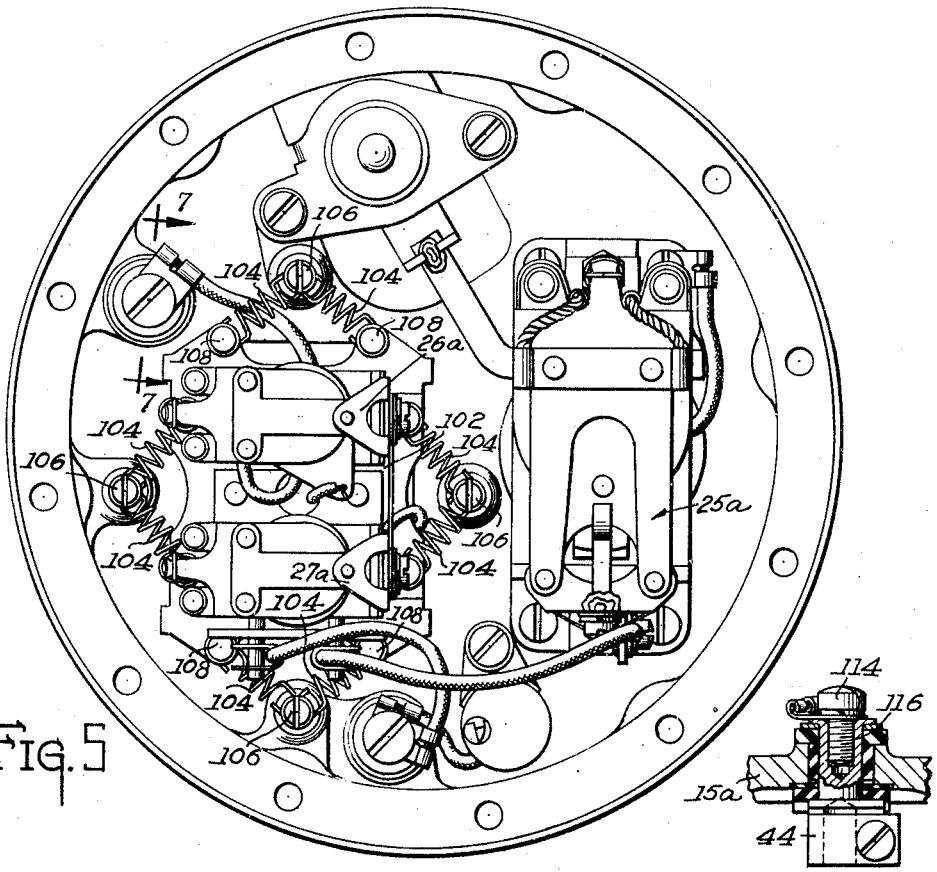
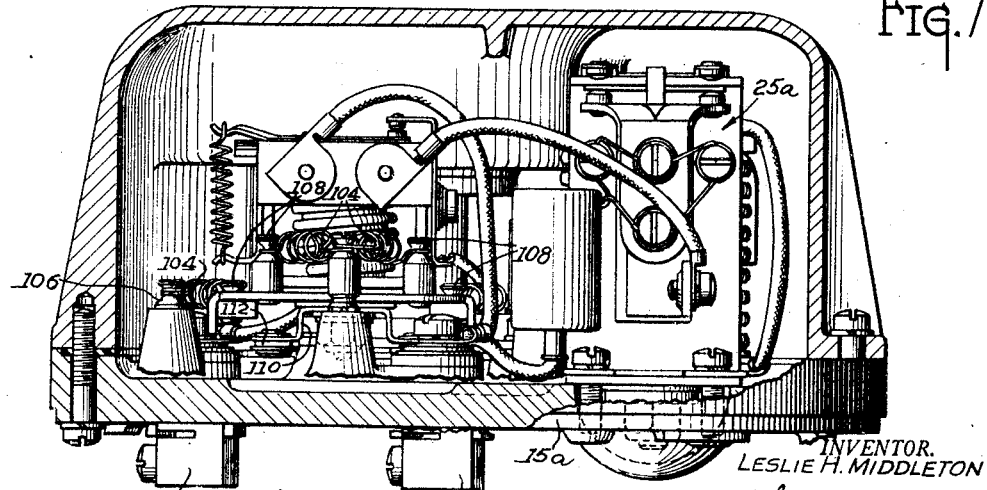
INVENTOR.
LESLIE H. MIDDLETON
BY Falvey, Souther & Stoltenberg

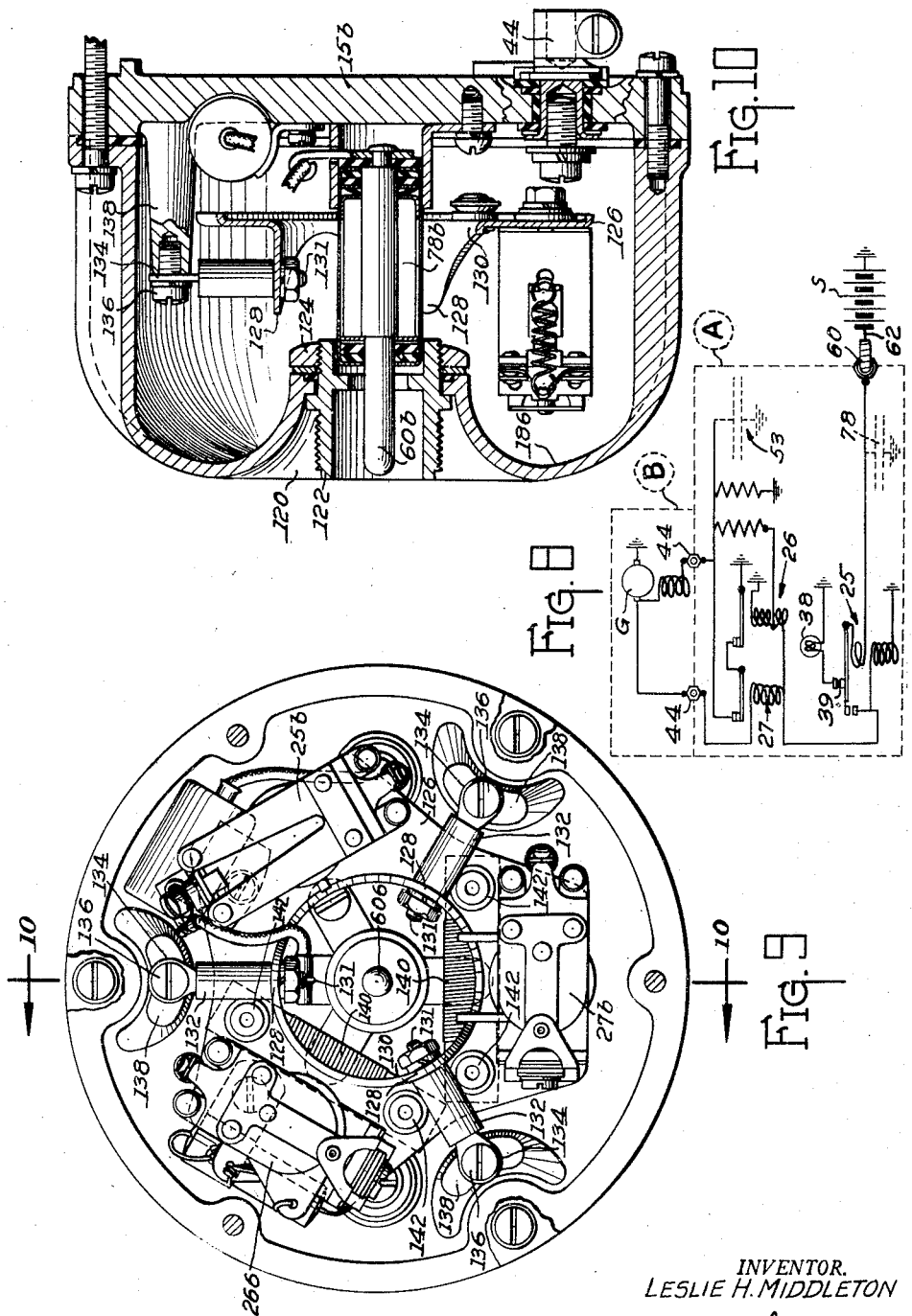

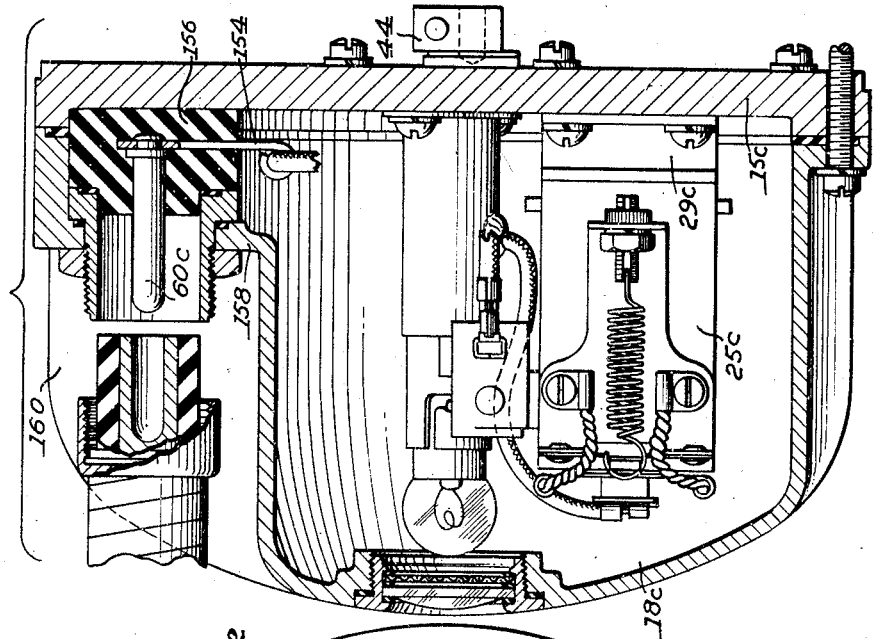
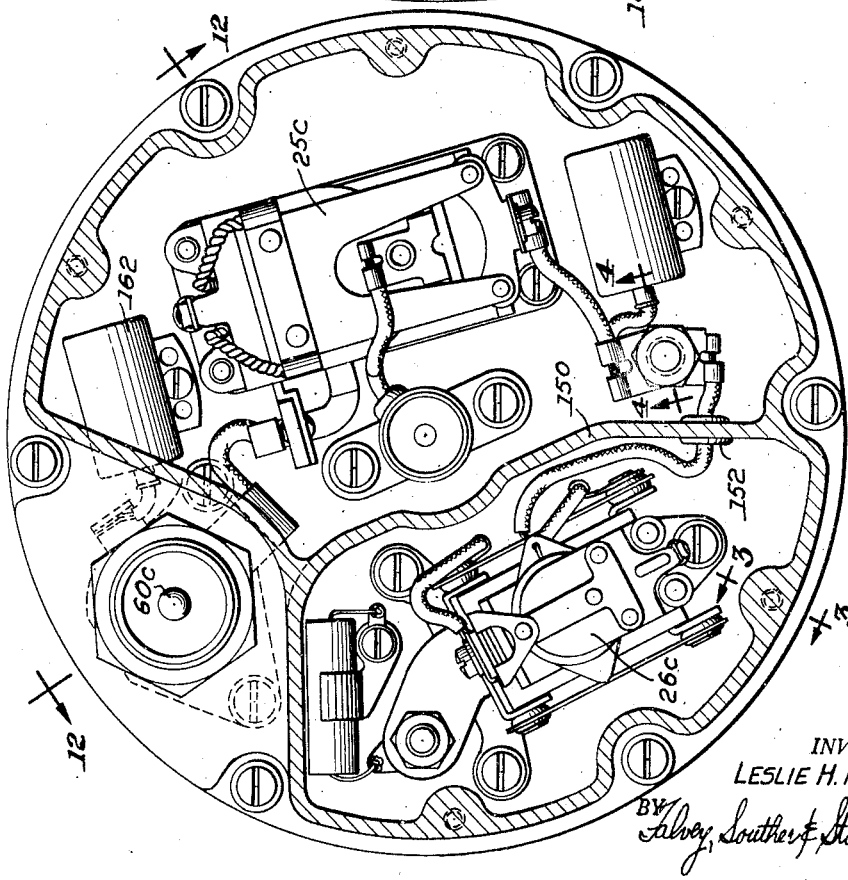

Patented Apr. 15, 1947

2,418,895

UNITED STATES PATENT OFFICE 2,418,895

GENERATOR CONTROL DEVICE HOUSING

Leslie H. Middleton, Lucas, Ohio

Application September 14, 1944, Serial No. 554,169

8 Claims. (Cl. 171—252)

This invention relates to generator regulating devices, particularly to the methods of mounting said regulating devices having reference to the generator and methods for shielding the same for radio emanations.

In the prior art generator regulating systems used with vehicles, such as half-track or round-wheel vehicles, have become unduly complicated involving many separate parts so that in the event of a breakdown, localization of the breakdown for purposes of repair, became very difficult.

This invention contemplates the provision of a means for regulating generators which is fabricated and fully adjusted at the manufacturing plant, and mounted in a protective shielding casing which creates a unit to be positioned in the electrical circuit of the generator without being adjusted in the field. This allows the regulating unit, in the event of a breakdown therein, to be removed as a unit and a new, completely adjusted regulator unit substituted in the place of the damaged unit. The protective casing in this construction serves a dual purpose, firstly, to protect the regulating apparatus from atmospheric conditions and, secondly, to shield the regulating apparatus from creating radio disturbances in its vicinity so as to interfere with sensitive radio receivers.

It is, therefore, a principal object of this invention to provide regulating equipment for a generator for use on vehicles which is completely enclosed in a protective housing or casing and capable of being inserted into the electrical circuit as a unit.

It is a further object of this invention to provide a mounting means including a protective housing or casing which protects the regulating apparatus from the atmosphere and shields the same for radio emanations.

It is a further object of this invention to provide regulating apparatus for a generator which is mounted in a protective casing at the manufacturing plant where the instruments have been carefully adjusted to allow insertion of the regulating equipment, by means of external binding posts, into the electrical system of a generator as a unit.

It is a further object of this invention to provide regulatory apparatus for a generator mounted within a protective casing which includes a visual signalling means to indicate the charging relations of the generator having reference to a battery in circuit therewith.

It is a further object of this invention to provide regulating apparatus for a generator suitable for use under very severe operating conditions wherein the vibratory regulating apparatus is resiliently mounted with a hermetically-sealed casing to protect the regulating apparatus from vibrations and jars resulting from extremely adverse operating conditions.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Fig. 1 is a plan view, partly in section, of the invention.

Fig. 2 is an elevational view, partly in section, taken along the line 2—2 of Fig. 1.

Fig. 3 is an elevational view of a detail, taken along the line 3—3 of Figs. 1 and 11.

Fig. 4 is an elevational view, partly in section, of a binding post, taken along the line 4—4 of Figs. 1 and 11.

Fig. 5 is a plan view of another modification of the regulating apparatus, showing the cover removed.

Fig. 6 is an elevational view, partly in section, of the modification shown in Fig. 5.

Fig. 7 is an elevational view, partly in section, of a binding post, taken along the line 7—7 of Fig. 5.

Fig. 8 is a schematic diagram of connections, showing the regulating apparatus cooperating with a generator and battery.

Fig. 9 is a plan view of another modification of the regulating apparatus.

Fig. 10 is an elevational view, partly in section, taken along the line 10—10 of Fig. 9.

Fig. 11 is a plan view, partly in section, of another modification of the regulating apparatus.

Fig. 12 is an elevational view, partly in section, taken along the line 12—12 of Fig. 11.

Referring to the drawings, particularly to Fig. 1, a base member 15 is provided in the form of a disk of relatively thick conformation to insure rigidity and strength. This base is preferably made of nonmagnetic metallic material, such as aluminum or the like, and is bored adjacent its perimeter by equidistant spaced apertures 16, there being six provided, through which project screws 17 which are threaded into the lip of a cup-shaped container 18 fitted to the base member. A gasket 19 is positioned in a recess 20 formed in the lip of the cup-like container 18 to form a hermetically-sealed container between the base 15 and the cup-like container when the screws 17 are rightly drawn up. A second series of equidistant apertures 21 is formed in the base member 15, being positioned in spaced relation with the apertures 16. A cooperating series of apertures 22 are formed in the lip of the cup-shaped container 18 and, when the container 18 and the base 15 are in cooperative relation, apertures 21 and 22 are in alignment to allow positioning of a screw 23 therein whereby the unitary assembly may be attached to a generator or the like. Six screws 23 are provided in the perimeter of the casing as is clearly shown in Fig. 1, each of the screws being mounted in indentations 24 formed in the side wall of the cup-like container 18.

The hermetically-sealed enclosure formed between the cup-like container 18 and the base member 15 is adapted to mount regulating apparatus as will be described in detail hereinafter. With the regulating apparatus assembled in completely adjusted condition in the casing, a unitary construction is formed which is adapted to be attached directly to the end head of a generator by means of screws 23 which thread into apertures formed on projecting lugs of the end plate, all as is disclosed and claimed in my copending application assigned to the same assignee Serial No. 483,137, filed April 15, 1943. A diagram of connections of the regulating equipment is disclosed in a schematic diagram of connections shown in Fig. 8 wherein the regulating apparatus as mounted in the hermetically-sealed container is bounded by the rectangular broken-line enclosure designated by the letter A. The generator with which the regulating equipment is adapted to cooperate is bounded by a broken-line rectangle generally indicated by the letter B. The cooperative relation between these two units will be described in further detail hereinafter.

On the base member 15 there are mounted the following regulatory apparatus: a circuit breaker 25, a voltage regulator 26 and a current regulator 27. Referring to Fig. 2, the method of mounting the circuit breaker 25 is clearly shown, wherein a base 28 of the circuit breaker 25 has vulcanized to it a hollow soft rubber block 29 which is also vulcanized to a plate 30, attached by screws 31 to the base member 15. In a similar manner, a plate 32, to which the voltage regulator 26 and the current regulator 27 are attached, by means of screws or the like, is mounted on the base member by means of another column of soft rubber (not shown) and another plate 32a, which is attached to the base member 15 by means of screws 33. The characteristics of the soft rubber columns must be such to damp vibrations of the base plate 15, and also to absorb sudden shocks or blows to which a vehicle is subject while in motion over rough terrain. These regulating instruments must be mounted so that when they vibrate upon their resilient mounts they do not touch the cup-like container 18 and are positioned in a cluster disposed about a center point of the container.

At the center part of the base member 15, a column 34 is attached thereto by means of screws 35 which cooperate with outwardly extending flanges 36. The upper end of the column 34 terminates in a bayonet socket 37 in which is positioned a bulb 38 which is under control of contact points 39 on the circuit breaker so that the bulb 38 will be illuminated when the circuit breaker is in open position. This is clearly shown in the diagram connections in Fig. 8. The bulb 38 is located beneath a threaded aperture 40 in the cup-like container 18 which is provided with a boss 40a to strengthen the wall adjacent the aperture. A threaded sleeve 41 fits into the aperture 40 and is provided with a colored transparent lens 42 hermetically-sealed therein and also with a metallic shielding screen 43. It will be clear that when the bulb 38 is illuminated an operator will become aware of this fact by light transmission through the transparent colored disk 42.

The regulating apparatus is placed in circuit with the generator G, as shown diagrammatically in Fig. 8, by means of binding posts 44 which are shown in detail in Fig. 4. The binding post consists of a threaded stud 45 which is positioned in an aperture 46 in the base plate 15, being insulated therefrom in the usual manner by means of insulation 47. The stud is provided with a head 48 which projects from the exterior face of the base member 15 as is most clearly shown in Fig. 2. The head 48 is provided with a split socket 49 which is adapted to embrace a stud (not shown) which forms a portion of the generator assembly and is in circuit with the generator. A screw 50 is provided in the wall of the split socket 49 to tighten the same to form a clamping head to grip the stud when in position therein to form a tight electrical connection. On the interior of the container, the stud 45 is provided with nuts 51, which form a convenient binding post for connectors 52 to place the regulating apparatus in circuit with the generator as is shown in Fig. 8. Two of these binding posts are provided. A condenser 53 is also connected to the binding posts 44 by means of a connector 54, the condenser being attached by a flange 55 on its casing to the base member 15 by means of a screw 56.

The electrical characteristics of the cut-out or circuit breaker 25, and the current and voltage regulator, depend largely upon the design of the generator for which they are adapted and may vary widely in their relation to each other and in their relation to the generator. Any devices of this type known in the art, such as found on Chrysler cars of the model year 1941, can be utilized in carrying out this invention, as well as any of the regulating circuits which may be used to regulate the output of the generator to give the desired characteristics. The circuit shown schematically in Figure 8 is a typical regulating circuit to be used and is only an incident to the invention.

Referring again to Fig. 8, the generator G with its field coil positioned in shielding envelope B, is connected with the regulating apparatus in shielding envelope A through the agency of two binding posts 44 which are positioned in the base member 15 as shown in detail in Fig. 4. The generator G and the regulating apparatus are placed in electrical circuit with a storage battery S by a binding post 60 (Fig. 2) with which a cable member 62 cooperates to complete the circuit through the battery S and return by ground, one terminal of each the battery S and the generator G being grounded as shown. This allows the generator G to charge the battery S through the agency of a single conductor in the cable member 62.

The binding post 60 comprises a stem 64, the lower end of which is held in a plate 66 having a central raised portion 68, said plate 66 being attached to the base member 15 by means of screws 70 (Fig. 1) screwed into the base member to allow the stem 64 to project through an aperture 72 in the envelope 18. The aperture 72 is formed in a side 74 of a bay 76 in the envelope 18, said side 74 being parallel to the base 15. Positioned about the stem 64 is a concentric condenser 78 positioned in insulated relation in a metallic shell 80, and having one terminal thereof connected to the stem with its other terminal grounded to the shell 80 which, in turn, is grounded with the base plate 15. The condenser shell is positioned at one end in a flange aperture 82 in the raised portion 68 of the plate 66, and at its other end in a recess 84 in a threaded sleeve 86 projecting through aperture 72 and provided with an outwardly extending flange 88. A nut 90 cooperates with the threaded portion of the sleeve 86 to lock it in the aperture 72, a sealing gasket 92 being provided to form a seal. The stem 64 projects from the condenser 78 into the threaded sleeve 86 in concentric relation therewith and terminates adjacent the outer end thereof. The length of the sleeve 86 is such that it terminates within the projected surface of the enclosure 18 over the bay 76 as is clearly shown in Fig. 2. Electrical connection is made at the inner end of the stem 64 by a connector lug 94 riveted to its end and projecting laterally from under the raised portion 68 of the plate 66. Conductor 96 is soldered or otherwise connected to the lug 94 with its other end connected to the circuit breaker 25 to carry out the diagram of connections shown in Fig. 8.

The stem 64, projecting in concentric relation into the sleeve 86, forms the male member of terminal post 60 which cooperates with female member 98 which is mounted in cable member 62 and insulated therefrom by tube 100. A threaded nipple 101 is provided to hold the female member in operative relation with the male member an form a sealed relation with the sleeve 86. The cable 62 is preferably provided with a metallic cover to shield the conductor for radio emanations. The cable 62 connects the generator with which the regulating apparatus sealed in the enclosure cooperates, with the battery of the electrical circuit of an automotive device as has already been described.

In the construction described, the regulating equipment for the generator is enclosed in a hermetically-sealed casing which protects the regulating devices from weather conditions and also from tampering by unauthorized and inexperienced persons. The regulating devices may be accurately adjusted and compensated by experienced persons at the factory and thereafter applied as a unit to a generator in the field in the event of a breakdown. Furthermore, the rounded contours of the casing with indented bay protect all the terminal posts from exposure to heavy blows which might break off projecting terminal posts.

In the modification of the invention shown in Figs. 5, 6 and 7, the cut-out or circuit breaker 25a is mounted directly on the base 15a without the use of shock absorbing devices. The voltage regulator 26a and the current regulator 27a are mounted on a flanged plate 102 which is suspended by tension springs 104 disposed at angular relation in pairs from buttresses 106 and 108 on the base member 15a and the plate 102 respectively, four being provided on the base member, each cooperating with one pair of springs 104, and eight being provided on the plate 102. It is desirable to mount the spring pairs in different planes as shown, which may be accomplished readily by designing the buttresses 106 and 108 on the plate 102 of the desired height. The plate 102 may be provided with a depending bracket 110 to which resistances 112 may be riveted so that they may be conveniently connected in the regulating circuit shown in Fig. 8.

Fig. 7 is comparable to Fig. 4 and discloses a modification of the binding posts 44. In this design a screw 114 is threaded into a bore 116 in the stud which is conveniently riveted in insulation in an aperture in the base member 15a. In order to give a better seal for the enclosure, all screws in this modification are threaded into apertures which are blind and do not extend through the walls of the enclosure. In other respects this modification is similar to that already described, except that the visual signalling means cooperating with the circuit breaker has been dispensed with.

In the modification of the invention disclosed in Figs. 9 and 10, a similar base member 15b with its cooperating enclosing member 18b is shown, however in this modification the terminal member 60b is mounted concentrically with the base member in a circular symmetrical depression 120. A threaded sleeve 122 is mounted in the depression in a manner similar to the other modifications except that nut 124 cooperating with the sleeve is mounted on the interior of the enclosure. The terminal member 60b is provided as before with a concentric condenser 78b mounted on the base member 15b.

The major difference in this modification is apparent in the method of suspending the regulating apparatus, the circuit breaker 25b, the voltage regulator 26b and the current regulator 27b so as to obviate shock. A flanged plate 126 is provided having upstanding lugs 128 disposed symmetrically about the perimeter of a large central aperture 130 concentric with the condenser 78b to which are attached, in any convenient manner as by studs 131, flexible members 132 of rubber or the like. Three flexible members may be provided 120° apart, and their outer ends are provided with eyelets 134 which cooperate with screws 136 which are threaded into bosses 138 integral with the base member 15b. The bosses 138 are preferably of uniform height to hold the plate 126 in parallel relation with the base member 15b. Upon the upper surface of plate 126, the regulating apparatus comprising the circuit breaker 25b, the voltage regulator 26b, and the current regulator 27b are mounted in symmetrical relation in the spaces between the flexible members 132. On the lower side of the plate 126, fixed resistances 140 are mounted by rivets 142 to be connected in the regulating circuit as shown in Fig. 8. In other respects this modification is similar to that first described except that the visual signalling means cooperating with the circuit breaker is again dispensed with.

In the modification of the invention disclosed in Figs. 11 and 12, differences arise from the modification first described in that the current regulator is dispensed with and only a circuit breaker 25c and a voltage regulator 26c are used. These are mounted on the base member 15c by means of the hollow rubber columns 29c as already described, and each device is mounted in a separate chamber by providing an integral dividing wall 150 forming a part of the enclosure member 18c. Electrical connections are made through apertures in this wall, being provided with rubber grommets 152 for further insulation and protection against abrasion as is most clearly shown in Fig. 11.

In this modification the terminal 60c is mounted with its connecting lug 154 in a solid block of molded insulation 156 which is held in position by the adjacent wall 158 of the deeper bay 160 in the enclosure member 18c. The concentric condenser is dispensed with and a separate condenser 162 is used instead. The diagram of connection is modified to dispense with the current regulator, but in other respects this modification differs from that first described only in the respects already described.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a device of the class described, a base plate of non-magnetic metal, a reverse-current circuit breaker, a voltage regulator and a current regulator resiliently mounted on said plate on one side thereof, each having an armature arranged to move in a plane in parallel relation with said plate, a signaling bulb mounted on same side of said plate under control of the circuit breaker, an output terminal mounted on said base plate extending normally thereto on the same side of said plate as the bulb, a pair of input terminals extending through said base plate and projecting therefrom on the side opposite of said output terminal, and a removable cover of non-magnetic metal adapted to be attached to said base plate having apertures to cooperate with said bulb and said output terminal to cover the circuit breaker, voltage regulator and current regulator.

2. In a device of the class described, a base plate of conductive material adapted to cooperate with a generator, regulatory apparatus having vibrating parts resiliently mounted on one side of said base to control the output of the generator, the vibrating parts of said regulatory apparatus moving in a plane in parallel relation with said base plate, a housing of conductive material adapted to be attached to said base plate to form a weatherproof housing for said regulatory apparatus and to suppress radio emanations, an output terminal projecting through said housing, visual signaling means in said housing including a bulb mounted on said base plate under control of said regulatory apparatus and input binding post extending through said base plate opposite to the side of said output terminal for connecting said regulatory apparatus to the generator.

3. In a device of the class described, an envelope comprising two cooperating parts to form a weatherproof enclosure, said envelope being formed of non-magnetic metal, a reverse-current circuit breaker, a voltage regulator and a current regulator resiliently mounted on said envelope on the interior of said enclosure, visual signaling means in the enclosure including a bulb under control of the reverse-current circuit breaker, an output binding post mounted on the exterior of said envelope and a pair of input terminals projecting through said envelope to form connections with a generator.

4. In a device of the class described, an envelope comprising two cooperating parts to form a weatherproof enclosure, said envelope being formed of non-magnetic metal, regulatory apparatus resiliently mounted on the inside of said enclosure, visual signaling means cooperating with said enclosure including a bulb under control of said regulatory apparatus, an indentation in said enclosure forming a socket therein, an output terminal mounted in said socket cooperating with said regulatory apparatus and input terminals projecting through apertures in said enclosure.

5. In a device of the class described, a base plate of non-magnetic metal adapted to cooperate with a generator, regulatory apparatus having vibrating parts resiliently mounted on said plate to control the characteristics of the output of the generator, the vibrating parts of said regulatory apparatus moving in a plane in parallel relation with said base plate, a housing of conductive material adapted to be attached to said base plate to form a weatherproof housing for said regulatory apparatus and to suppress radio emanations, integral dividing walls on the interior of said housing to shield the vibrating parts of the regulatory apparatus, and visual signaling means in said housing including a bulb under control of the regulatory apparatus.

6. In a device of the class described, an envelope comprising a base portion and a compartmented cover portion cooperating therewith to form a weatherproof enclosure, said envelope being formed of non-magnetic metal, regulatory apparatus resiliently mounted on the base portion on the inside of the enclosure, visual signaling means in said envelope including a bulb under control of said regulatory apparatus, an indentation in said envelope on the exterior thereof to form a socket, and an output terminal mounted in said socket.

7. In a device of the class described, an envelope comprising a base and a cover portion cooperating therewith to form a weatherproof enclosure, said envelope being formed of non-magnetic metal, regulatory apparatus having a vibrating portion resiliently mounted on said plate, said vibrating parts being adapted to move in a plane substantially parallel to the base plate, and visual signaling means in said envelope including a bulb under control of the regulatory apparatus.

8. In a device of a class described, an envelope comprising a base portion and a cover portion cooperating therewith to form a weatherproof enclosure, said envelope being formed of non-magnetic metal, regulatory apparatus resiliently mounted on said base portion inside of said enclosure, an indentation on the exterior of said envelope forming a socket therein, an output terminal mounted in said socket and a pair of input terminals projecting through said base, said three terminals forming means of connecting said regulatory apparatus in circuit with a generator and a battery.

LESLIE H. MIDDLETON.